United States Patent
Harriman

(10) Patent No.: US 7,104,783 B2
(45) Date of Patent: Sep. 12, 2006

(54) MOLD TOOLING HAVING CAVITY STABILIZERS

(75) Inventor: Todd E Harriman, Lexington, NC (US)

(73) Assignee: Tyco Electronics Corporation, Middletown, PA (US)

( * ) Notice: Subject to any disclaimer, the term of this patent is extended or adjusted under 35 U.S.C. 154(b) by 316 days.

(21) Appl. No.: 10/633,802

(22) Filed: Aug. 4, 2003

(65) Prior Publication Data

US 2005/0029710 A1    Feb. 10, 2005

(51) Int. Cl.
*B29C 45/18*    (2006.01)

(52) U.S. Cl. ............ 425/572; 264/328.1; 425/577

(58) Field of Classification Search ............ 264/328.1; 249/145, 176; 425/572, 577
See application file for complete search history.

(56) References Cited

U.S. PATENT DOCUMENTS

| | | | |
|---|---|---|---|
| 3,986,804 A | 10/1976 | Albright | 425/190 |
| 4,039,215 A | 8/1977 | Minhinnick | 293/71 R |
| 4,128,384 A | 12/1978 | Albright | 425/548 |
| 4,298,566 A | 11/1981 | Naus et al. | 264/317 |
| 4,443,173 A | 4/1984 | Mansberger, II | 425/126 R |
| 4,828,479 A | 5/1989 | Pleasant | 425/192 R |
| 4,959,002 A | 9/1990 | Pleasant | 425/192 R |
| 5,217,728 A | 6/1993 | Grabbe | 425/443 |
| 5,587,116 A | 12/1996 | Johnson et al. | 264/1.25 |
| 6,206,681 B1 * | 3/2001 | Kawase et al. | 425/572 |

FOREIGN PATENT DOCUMENTS

| | | | |
|---|---|---|---|
| JP | 43-221423 A1 | | 1/1990 |
| JP | 3-221423 | * | 9/1991 |

* cited by examiner

*Primary Examiner*—Tim Heitbrink

(57) ABSTRACT

Mold tooling for molding plastic parts having cavities therethrough includes mold halves together with core pins to define passageways through the molded part. The core pins are locked together to rigidify these connections, and one of the core pins includes a rib to contact an adjacent pair of ribs to rigidify a column of ribs.

20 Claims, 6 Drawing Sheets

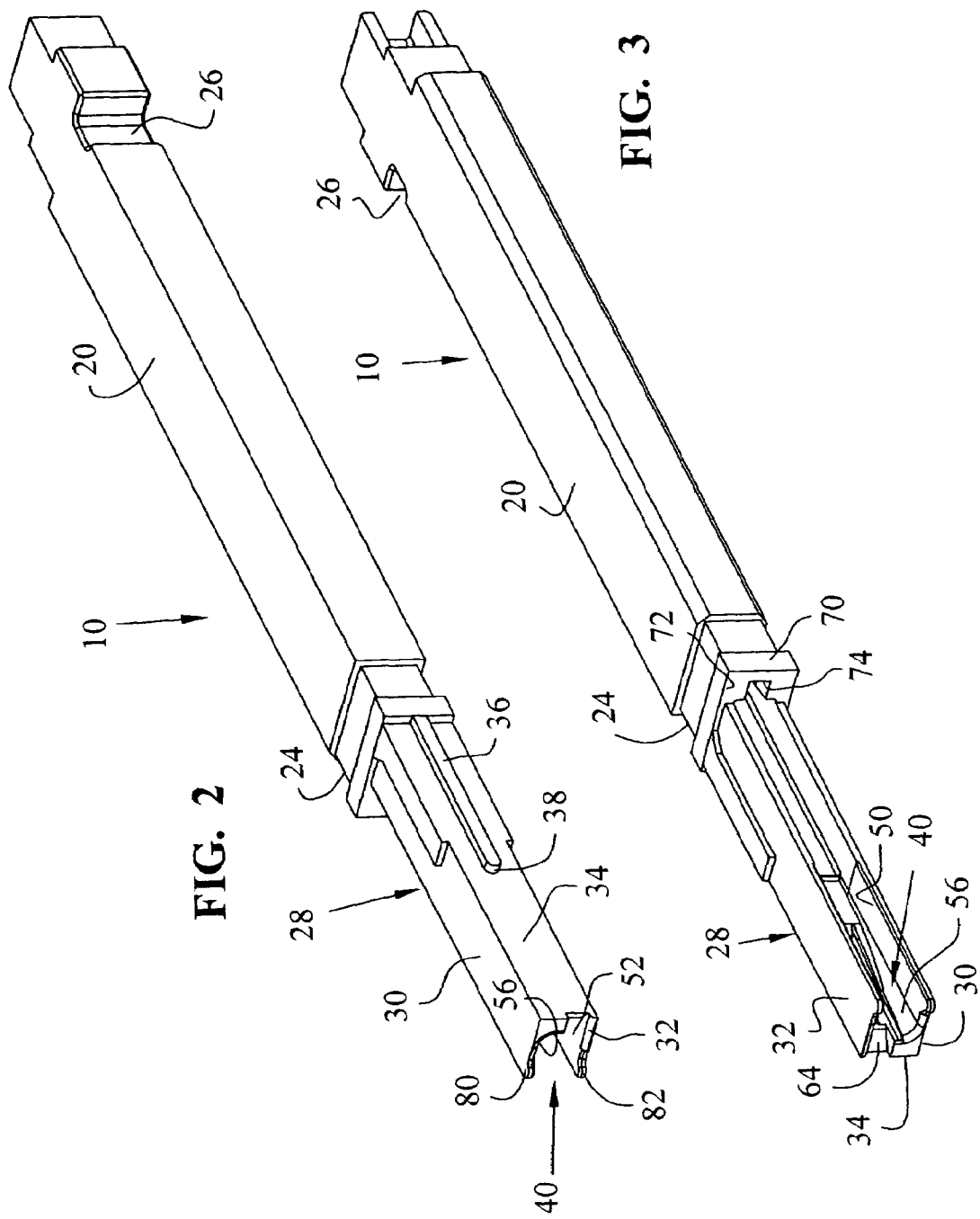

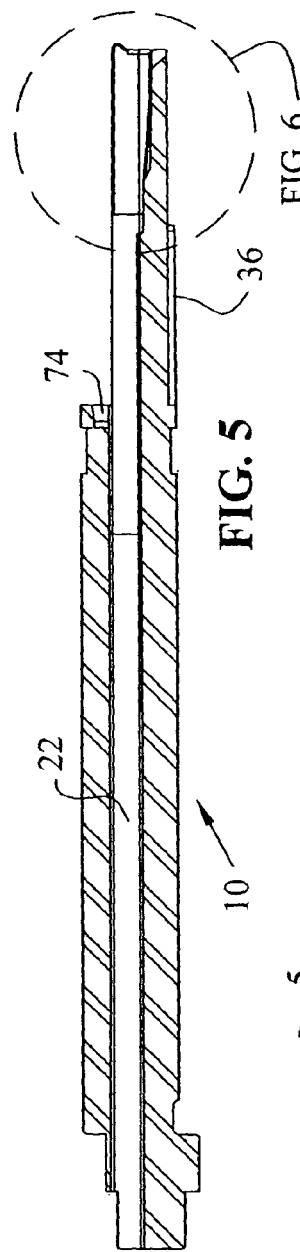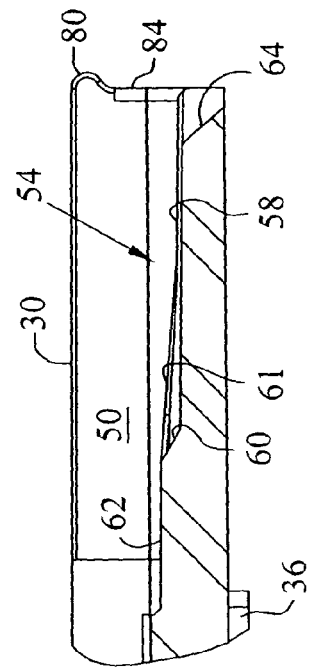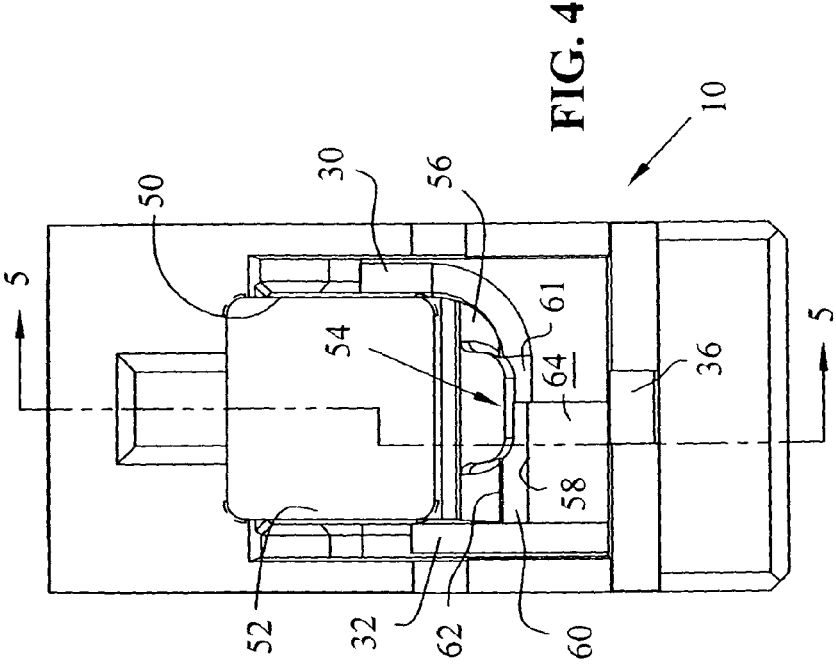

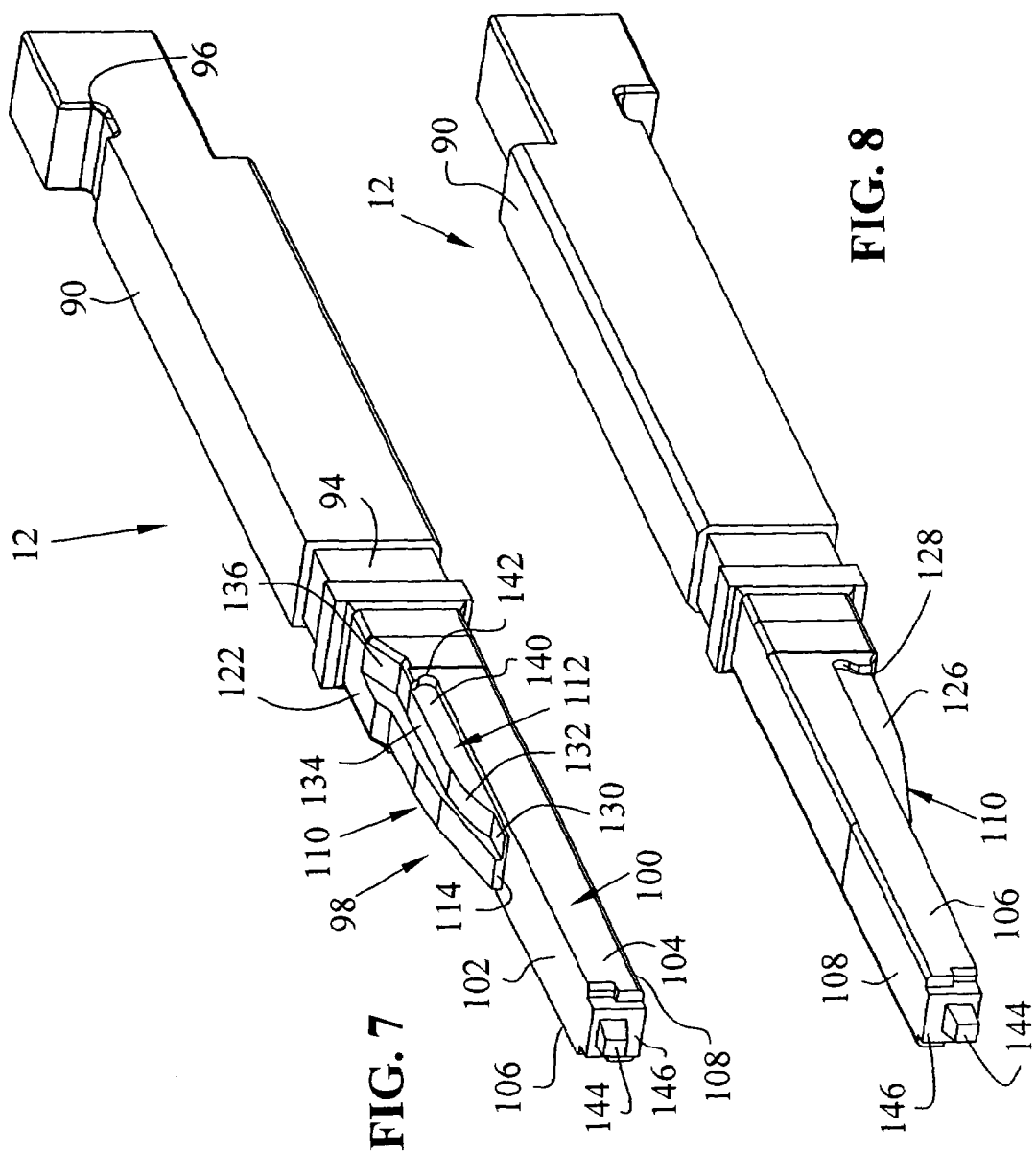

MOLD TOOLING HAVING CAVITY STABILIZERS

FIELD OF THE INVENTION

The subject invention relates to mold tooling, and in particular to tooling having improved and stabilized core pins.

BACKGROUND OF THE INVENTION

It is common in the field of molding, and in particular, in the field of molding plastic parts, to provide injection molds, where the part to be molded is defined by a cavity, profiled in the corresponding molds. Obviously, the injection molten plastic fills the cavity void, and defines the injection molded part by the cavity void. When passageways are to be defined in the molded part, so-called core pins are positioned on corresponding mold halves, such that the injected plastic fills the void, but leaves a passageway where the core pins existed, after the part is removed. One such system is shown in U.S. Pat. No. 4,828,479, incorporated herein by reference.

So is the case when molding plastic housings for electrical connectors. Typically, mold tooling will include a plurality of cavities for "multi-shot" injection molding, of a plurality of electrical connectors. The electrical connector housings include a plurality of passageways extending between a mating face and a rear face, and are generally profiled to receive electrical contacts or terminals therein. A plurality of core pins exist to define the passageways, such as various geometries, shoulders for locking lances and the like.

In recent years, electrical connectors have become smaller; have overall reduced dimensions and center-line spacings, and at the same time, have become more complicated in design, requiring primary and secondary locking for the terminals, terminal position assurance devices (TPA), shunting, and the like. Resultantly, it is sometimes necessary then to increase the pressure of the injection molded plastic in order to fill the ever decreasing interstices of the mold cavity.

All of the above factors have increased the complexity of the molding process. As the core pins are cantilevered within the molding cavity, it is not uncommon to have core pins deflect due to the enormous pressure within the cavity. Deflected core pins result in passageways which may be off center relative to their specifications.

Thus, the objects of the invention are to overcome the shortcomings of the prior art mold tooling.

BRIEF DESCRIPTION OF THE DRAWINGS

FIG. 2 is a perspective view of one of the core pins shown in FIG. 1;

FIG. 3 is another perspective view of the core pins of FIG. 2 from the opposite site thereof;

FIG. 4 is a front plan view of the core pins of FIG. 2;

FIG. 5 is a cross-sectional view through lines 5—5 of FIG. 4;

FIG. 6 is an enlarged view of the area denoted in FIG. 5;

FIG. 7 is a perspective view of the corresponding core pins for use with the core pins of FIGS. 2–6;

FIG. 8 is another perspective view of the core pins of FIG. 7 from the opposite side thereof;

DETAILED DESCRIPTION OF THE PREFERRED EMBODIMENT

Figure 1:
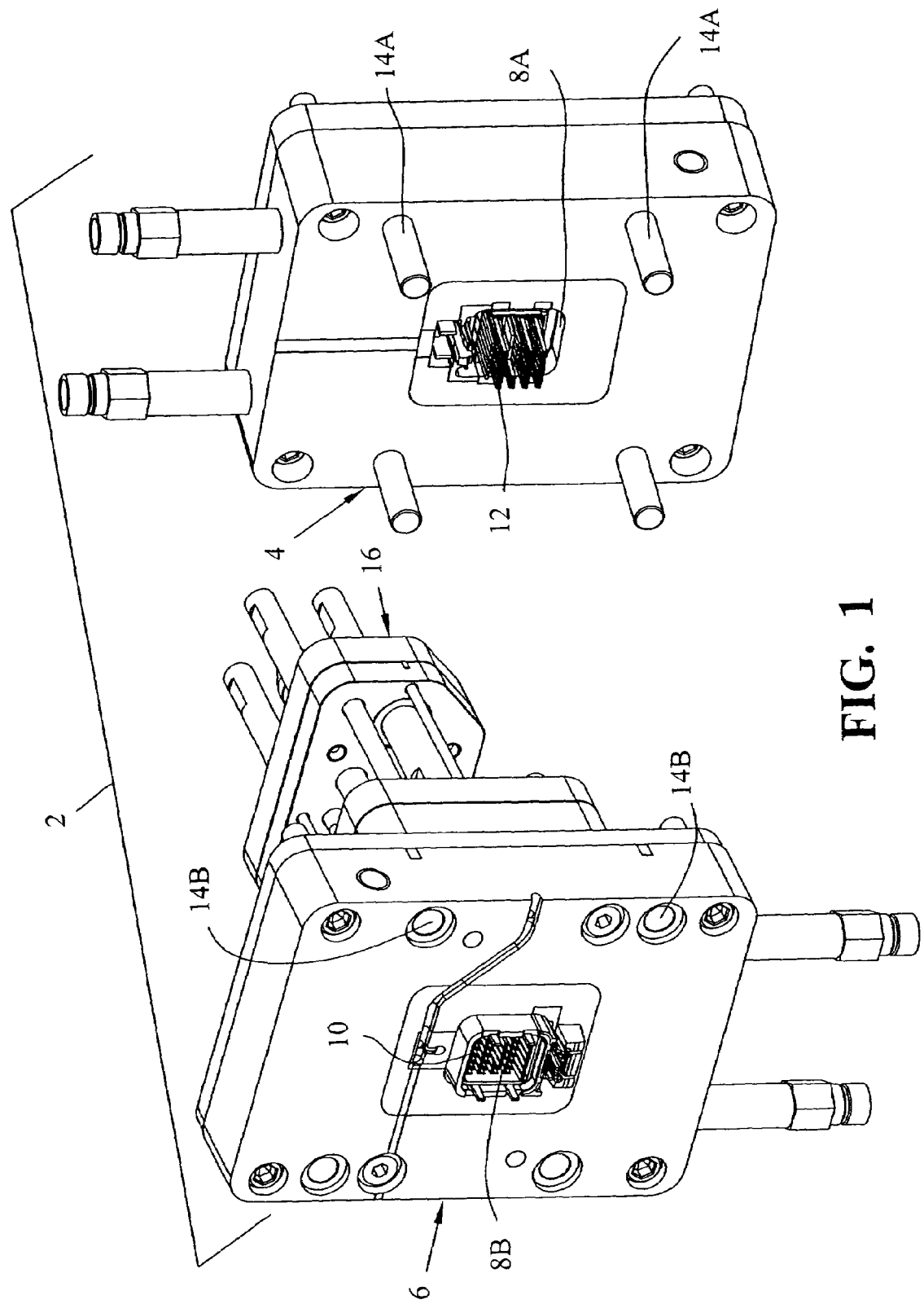
FIG. 1 is a perspective view of the inventive mold cavity and core pins.
Figure 9:
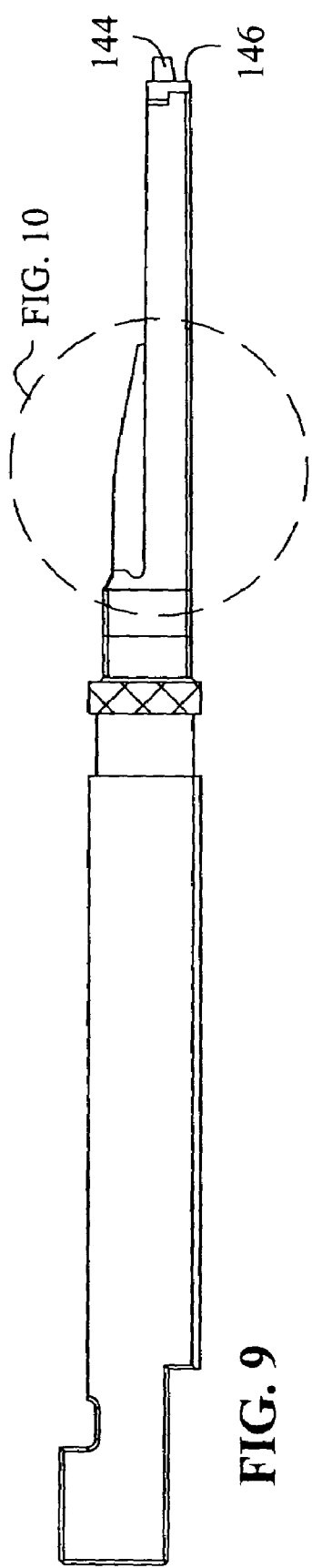
FIG. 9 is a side plan view of the core pins of FIGS. 7 and 8.
Figure 10:
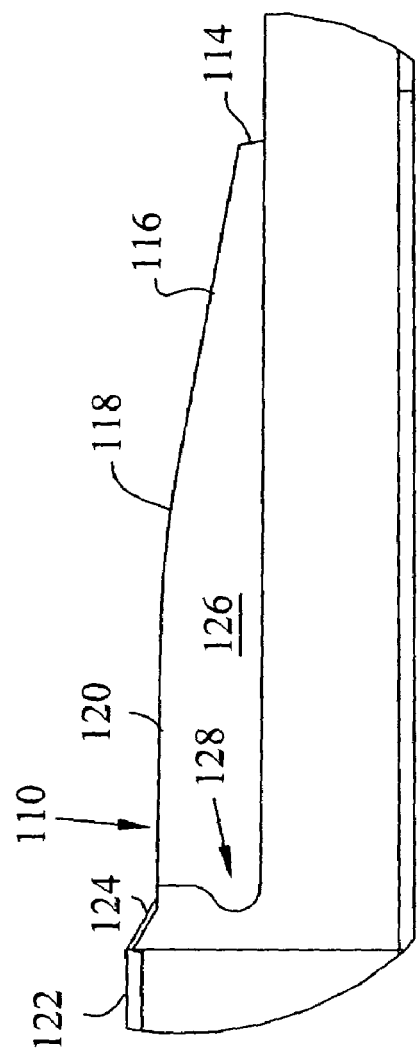
FIG. 10 is an enlarged view of the area denoted in FIG. 9.

With respect first to FIG. 1, a molding machine is shown generally at 2. In FIG. 1, a single cavity mold is depicted for simplicity, however, it should be appreciated to one skilled in the art that a multiple cavity mold is also envisioned. The single cavity mold is generally defined by counterpart mold halves 4 (the "A" side) and 6 (the "B" side), which together define a cavity 8 for the molded part, defined by cavity parts 8A and 8B. It should also be appreciated to one skilled in the art that, when passageways are desired in a molded part, core pins are positioned within the mold cavity, such that the mold material, typically plastic, does not fill the area occupied by the core pins, and hence form the passageways. In the context of the present invention, the mold machine is particularly usable for molding insulative plastic housings for connectors, where the housings have one or more passageways therethrough and which are each profiled to receive an electrical terminal therein. Thus, and with reference still to FIG. 1, core pins 10 and 12 are extendable and retractable into the mold cavity 8, thereby defining the passageways.

With reference still to FIG. 1, mold parts 4, 6 would also include other conventional constituents, such as leader pins 14A and counterpart bushings 14B, to align the mold parts 4, 6. The mold part 6 would also include ejector toolings shown generally at 16.

With reference now to FIGS. 2–6, core pin 10 will be described in greater detail. With reference first to FIGS. 2 and 3, core pin 10 will be described. Core pin 10 includes a generally elongate and hollow shank portion 20, having a through bore 22 (FIG. 5) therethrough, for accepting a vent pin to allow the escape of gases during the molding process. Shank portion 20 is defined with a low pressure area 24 for providing a gas vent dump, and with a gripping indentation at 26 for retaining the core pins 10 in the tooling plates. A tooling portion 28 extends forwardly from shank portion 20.

Tooling portion 28 generally includes a U-shaped configuration, with side walls 30, 32 and bottom wall 34. An elongate rib 36 extends from a position adjacent the shank portion 20, and extends forwardly to a rounded front tip 38. As shown best in FIGS. 3 and 4, the tooling portion 28, has a U-shaped cavity 40 generally defined by the side walls 30, 32 and bottom wall 34. The cavity 40 is defined by internal surfaces 50 and 52 (FIGS. 2 and 3) of walls 30, 32, respectively, and internal floor 54 (FIG. 6) of wall 34. Floor 54 has an arcuately shaped surface at 56, and substantially flush floor portion 58 which extends rearwardly to beveled surface 60, which in turn, inclines to upper surface 62. Beveled surface 64 also extends rearwardly and upwardly to floor portion 58. As shown best in FIG. 6, floor 54 also includes an incline at 60 which also raises to upper surface 62.

With respect now to FIG. 3, indentation 24 defines an enlarged section at 70 having a forwardly facing surface at 72, through which aperture 74 extends. With respect to FIG. 2, semi-circular projections 80, 82 extend respectively from walls 30, 32. Both projections 80, 82 are identical in configuration, and the precise configuration of projection 80 is viewed in FIG. 6, where projection 80 extends forwardly from an end edge 84 of wall 30.

With respect now to FIGS. 7–10, core pin 12 will be described in greater detail. Core pin 12 includes a shank portion 90 having a low pressure area at 94 for providing a gas vent dump and with a gripping indentation at 96. Core pin 12 further includes a tooling portion 98 extending forwardly therefrom. It should be appreciated that the core pin 12, and particularly the tooling portion 98, is profiled as the counterpart to tooling portion 28.

With respect first to FIG. 7, tooling portion 98 includes an extension portion 100, having a wall 102, side walls 104, 106, and wall 108. Ramp sections 110, 112 extend from wall 102 rearwardly. As shown best in FIG. 10, ramp 110 includes a front edge 114, an inclined portion 116, a radiused portion 118, and an upper surface 120. Upper surface 120 transitions to surface 122 through incline 124. As also viewed in FIGS. 8 and 10, ramp section 110 includes an outer side surface at 126. Furthermore, a recessed opening 128 is defined at the transition between side walls 126 and 106 which faces forwardly. The exact geometry of opening 128 is best viewed in FIG. 10.

With respect now to FIG. 7, ramp 112 will be described in greater detail. Ramp 112 includes a forward surface at 130, a radiused section at 132, a surface 134, a transition section at 136, which transitions to surface 122. Ramp 112 is inset from wall 104, which defines a surface 140, parallel to surface 126, as will be described herein. Furthermore, a recessed opening 142 is defined at the transition between side wall 140 and side wall 104, which face forward. Recessed opening 142 has the exact configuration as recessed opening 128. Finally, a projection 144 extends forwardly from a front wall 146 as shown in any of FIGS. 7, 8 or 9.

Figure 11:
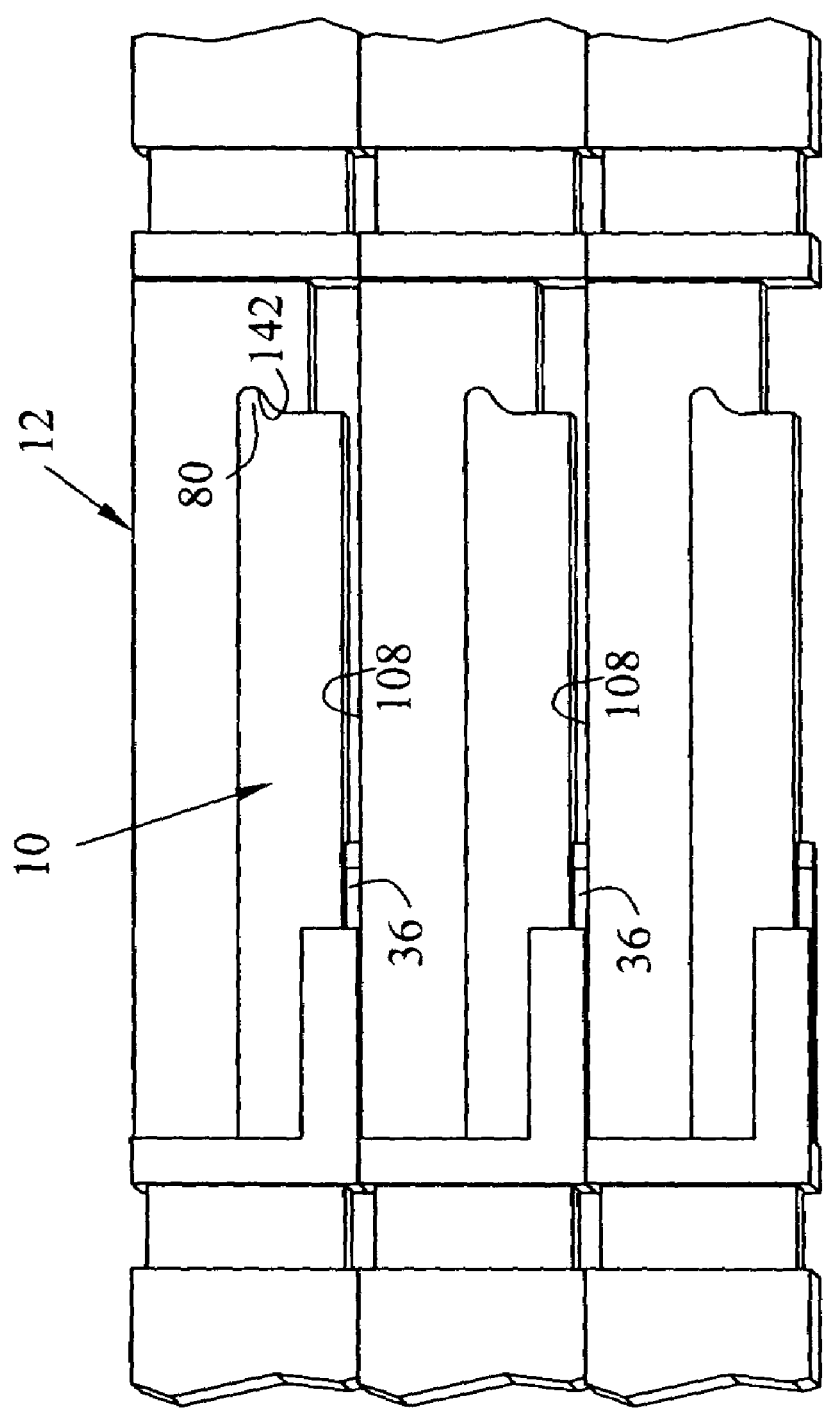
FIG. 11 is a perspective view of the core pins fully positioned in the mold, showing the core pins stacked one above the other.

With respect now to FIG. 11, the interaction and cooperation of core pins 10, 12 will now be described. As shown best in FIG. 11, it will be first observed that a plurality of pairs of core pins 10, 12 are included, and as shown in FIG. 11, are arranged to define a plurality of terminal passageways arranged in a column. As will be described, each of the core pins 10, 12 interact with, and lock to, each other, and each pair of core pins 10, 12 engage each other to rigidify the column.

With respect first to the locking interaction, it should be appreciated that the side surfaces 126, 140 of core pin 12 (FIGS. 7 and 8) are profiled to be received within and against corresponding internal surfaces 50, 52 of core pin 10 (FIG. 4) with surface 126 adjacent surface 52, and surface 140 adjacent surface 50. This also allows the interaction of inclined surfaces 58, 60 with 110 (FIGS. 6 and 7) and inclined surfaces 61 and 112, to define a molded surface.

Core pins 10, 12 are also interlocked with each other at two separate locations. First, projection 144 (FIG. 8) is profiled to be received in, and by, recessed opening 74 (FIG. 3). Secondly, projections 80, 82 are profiled to be received in, and by, corresponding recesses 142, 128 (FIGS. 2, 7 and 8). This locks the core pins 10, 12 together in a vertical and lateral sense.

Finally, as viewed in FIG. 11, the core pins are profiled to be in engagement with each other in a vertical column. As shown, the rib 36 of one corresponding pair of core pins 10, 12 is profiled to engage surface 108 of the adjacent pair of core pins. Advantageously, this engagement stabilizes the core pins in a vertical sense, such that the core pins do not deflect in the vertical sense during high injection molding pressures, causing inaccurate passageways.

The invention claimed is:

1. A molding apparatus for molding plastic components, the molding apparatus having a plurality of cavities for receiving the material to be molded, and retractable core pins entering each cavity from opposite sides thereof, at least one of the retractable core pins having an engagement member for engaging a core pin in an adjacent cavity to rigidify the pins during the molding process.

2. The molding apparatus according to claim 1, wherein at least some of said cavities are positioned one above the other to form a column of cavities, and said core pins are comprised of a plurality of first core pins entering from a first side and a second plurality of core pins entering from a second side thereof, said first and second plurality cooperating to form a passageway through a molded product.

3. The molding apparatus according to claim 2, wherein one of said first and second plurality of core pins are substantially U-shaped and the other of said first and second plurality of core pins are received in said U-shape to form a closed core pin assembly.

4. The molding apparatus according to claim 1, wherein said engagement member is defined as a rib extending longitudinally along the length of one of said core pins, and is profiled to engage, a core pin in an adjacent cavity.

5. The molding apparatus according to claim 4, wherein at least some of said cavities are positioned one above the other to form a column of cavities, and said core pins are comprised of a plurality of first core pins entering from a first side and a second plurality of core pins entering from a second side thereof, said first and second plurality cooperating to form a passageway through a molded product.

6. The molding apparatus according to claim 5, wherein ribs extend from one of said first and second plurality of core pins, and engage the other of said first and second plurality of core pins.

7. The molding apparatus according to claim 6, wherein said ribs are positioned from row to row to provide cumulative support in the vertical direction.

8. The molding apparatus according to claim 7, wherein said ribs are positioned on a lower surface of one of said first and second plurality of core pins, and engage the top surface other of said first and second plurality of core pins.

9. The molding apparatus of claim 6, wherein said molding apparatus is profiled for molding electrical connector housings, said first and second plurality of core pins defining terminal receiving passageways therethrough extending from a front face thereof, said ribs defining a slot extending from a position adjacent said front face to a position rearward into said cavity.

10. The molding apparatus according to claim 5, wherein said first and second plurality of core pins include interlocking members thereon for locking with each other to rigidify the pins during the molding process.

11. The molding apparatus according to claim 10, wherein one of said first and second plurality of core pins are substantially U-shaped and the other of said first and second plurality of core pins are received in said U-shape to form a closed core pin assembly, said interlocking members being defined by longitudinal extensions from said U-shaped walls which interlock with corresponding recesses in the other of said first and second plurality of core pins.

12. A molding apparatus for molding plastic components, the molding apparatus having a cavity for receiving the material to be molded, and retractable core pins entering the cavity from opposite sides thereof, the retractable core pins having interlocking members thereon for locking with each other to rigidify the pins during the molding process.

13. The molding apparatus according to claim 12, wherein at least some of said cavities are positioned one above the other to form a column of cavities, and said core pins are comprised of a plurality of first core pins entering from a first side and a second plurality of core pins entering from a second side thereof, said first and second plurality cooperating to form a passageway through a molded product.

14. The molding apparatus according to claim 13, wherein one of said first and second plurality of core pins are substantially U-shaped and the other of said first and second plurality of core pins are received in said U-shape to form a closed core pin assembly.

15. The molding apparatus according to claim 14, wherein said interlocking members are defined by longitudinal extensions from said U-shaped walls which interlock with corresponding recesses in the other of said first and second plurality of core pins.

16. The molding apparatus according to claim 13, wherein said engagement member is defined as a rib extending longitudinally along the length of one of said core pins, and is profiled to engage, a core pin in an adjacent cavity.

17. The molding apparatus according to claim 16, wherein at least some of said cavities are positioned one above the other to form a column of cavities, and said core pins are comprised of a plurality of first core pins entering from a first side and a second plurality of core pins entering from a second side thereof, said first and second plurality cooperating to form a passageway through a molded product.

18. The molding apparatus according to claim 17, wherein ribs extend from one of said first and second plurality of core pins, and engage the other of said first and second plurality of core pins.

19. The molding apparatus according to claim 18, wherein said ribs are positioned from row to row to provide a cumulative effect of support in the vertical direction.

20. The molding apparatus according to claim 19, wherein said ribs are positioned on a lower surface of one of said first and second plurality of core pins, and engage the top surface other of said first and second plurality of core pins.

* * * * *